United States Patent
Matsuno (10) Patent No.: US 12,433,277 B2
(45) Date of Patent: Oct. 7, 2025

(54) ELECTRIC REEL

(71) Applicant: GLOBERIDE, Inc., Tokyo (JP)

(72) Inventor: Keisuke Matsuno, Tokyo (JP)

(73) Assignee: GLOBERIDE, INC, Tokyo (JP)

( * ) Notice: Subject to any disclaimer, the term of this patent is extended or adjusted under 35 U.S.C. 154(b) by 179 days.

(21) Appl. No.: 18/241,056

(22) Filed: Aug. 31, 2023

(65) Prior Publication Data

US 2024/0081304 A1 Mar. 14, 2024

(30) Foreign Application Priority Data

Sep. 9, 2022 (JP) ................................. 2022-144010

(51) Int. Cl.
*A01K 89/01* (2006.01)
*A01K 89/012* (2006.01)

(52) U.S. Cl.
CPC ........ *A01K 89/0117* (2013.01); *A01K 89/012* (2013.01); *A01K 89/01127* (2015.05)

(58) Field of Classification Search
CPC .............. A01K 89/017; A01K 89/0173; A01K 89/0186; A01K 89/0188; A01K 89/0189; A01K 89/01901
See application file for complete search history.

(56) References Cited

U.S. PATENT DOCUMENTS

| | | | |
|---|---|---|---|
| 3,017,134 A | 1/1962 | Duvall | |
| 2003/0038200 A1* | 2/2003 | Chiba | A01K 89/0183 |
| | | | 242/249 |
| 2006/0283998 A1* | 12/2006 | Ono | A01K 89/017 |
| | | | 242/253 |
| 2008/0173744 A1* | 7/2008 | Terauchi | A01K 89/017 |
| | | | 242/250 |
| 2009/0039190 A1* | 2/2009 | Amano | A01K 89/017 |
| | | | 242/250 |
| 2012/0318902 A1* | 12/2012 | Kawabe | A01K 89/057 |
| | | | 242/298 |
| 2023/0172179 A1* | 6/2023 | Suginami | A01K 89/017 |
| | | | 242/250 |

FOREIGN PATENT DOCUMENTS

| | | | | |
|---|---|---|---|---|
| CN | 104012480 A | * | 9/2014 | ........... A01K 89/017 |
| CN | 105519501 A | * | 4/2016 | ........... A01K 89/015 |

(Continued)

OTHER PUBLICATIONS

Feb. 16, 2024 Office Action issued in Taiwanese Patent Application No. 112133971.

(Continued)

*Primary Examiner* — Emmanuel M Marcelo
(74) *Attorney, Agent, or Firm* — Oliff PLC (57) ABSTRACT

An electric reel according to one embodiment of the present disclosure comprises: a spool around which a fishing line is wound; a motor having a motor shaft and driven for rotating the spool; a one-way clutch provided for preventing reverse rotation of the motor; a motor shaft fixing member fixed to the motor shaft; and a one-way clutch shaft member fitted into the one-way clutch. The electric reel is configured such that rotation of the motor is transmitted to the one-way clutch through the motor shaft fixing member and the one-way clutch shaft member.

4 Claims, 10 Drawing Sheets

(56) References Cited

FOREIGN PATENT DOCUMENTS

| JP | H01094065 U | | 6/1989 | | |
|---|---|---|---|---|---|
| JP | 2020-103062 A | | 7/2020 | | |
| KR | 20130024765 A | * | 3/2013 | ........... | A01K 89/017 |
| KR | 20140020722 A | * | 2/2014 | ........... | A01K 89/017 |
| TW | 200603726 A | | 2/2006 | | |
| WO | WO-2020016539 A1 | * | 1/2020 | ........... | A01K 89/004 |

OTHER PUBLICATIONS

Jul. 8, 2025 Office Action issued in Japanese Patent Application No. 2022-144010.

* cited by examiner

ELECTRIC REEL

CROSS-REFERENCE TO RELATED APPLICATION

This application claims priority under 35 U.S.C. § 119 to Japanese Patent Application No. 2022-144010 filed on Sep. 9, 2022 in the Japanese Patent Office, the entire contents of each hereby incorporated by reference.

FIELD

The present disclosure relates to a fishing electric reel.

BACKGROUND

Conventionally, various fishing electric reels including an electric motor and a one-way clutch have been known.

As such a fishing electric reel, for example, JP H01-94065 U discloses an electric reel. When winding a fishing line onto a spool (rotating body), a handle is rotated together with driving of an electric motor so that the rotating speed of the handle is synchronized with the driving speed of the electric motor. As a result, the electric reel winds the fishing line at a relatively high speed.

SUMMARY

However, it has been found that when the coaxiality between a motor shaft (axis) and a shaft (axis) of the one-way clutch is low, such an electric reel has problems such as a decrease in product life due to wear of the one-way clutch, noise during winding by the electric reel, a decrease in winding efficiency of the electric reel, and damage to the one-way clutch due to seizure. On the other hand, when an outer diameter of the one-way clutch increases, the size of a bearing disposed around the one-way clutch also increases, so that there has been another problem that the manufacturing cost increases.

The present disclosure has been made in view of the above circumstances, and an object of the present disclosure is to provide an electric reel that enables rotation transmission from a motor to a one-way clutch, prolongs the product life, and can reduce the cost by reducing an outer diameter of the one-way clutch and reducing the size of a bearing, without necessarily relying on the coaxiality between a motor shaft (axis) and a shaft (axis) of the one-way clutch. Other objects of the present disclosure will become apparent by reference to the entire present specification.

An electric reel according to one embodiment of the present disclosure comprises: a spool around which a fishing line is wound; a motor having a motor shaft and driven for rotating the spool; a one-way clutch provided for preventing reverse rotation of the motor; a motor shaft fixing member fixed to the motor shaft; and a one-way clutch shaft member fitted into the one-way clutch. The electric reel is configured such that rotation of the motor is transmitted to the one-way clutch through the motor shaft fixing member and the one-way clutch shaft member.

In the electric reel according to one embodiment of the present disclosure, the motor shaft fixing member and the one-way clutch shaft member are configured to transmit the rotation with allowing a predetermined amount of clearance therebetween.

In the electric reel according to one embodiment of the present disclosure, the motor shaft fixing member has a recess at one end in an axial direction of the motor shaft, and has a fitting portion at the other end. The motor shaft is fitted into the fitting portion.

In the electric reel according to one embodiment of the present disclosure, the one-way clutch shaft member has a protrusion at one end in the axial direction of the one-way clutch shaft member. The protrusion of the one-way clutch shaft member is engaged with the recess of the motor shaft fixing member.

In the electric reel according to one embodiment of the present disclosure, the other end of the one-way clutch shaft member in the axial direction of the one-way clutch shaft member is fitted into the one-way clutch having a circular cylindrical shape.

According to the above embodiments, it is possible to provide an electric reel that enables rotation transmission from the motor to the one-way clutch, prolongs the product life, and can reduce the cost by reducing an outer diameter of the one-way clutch and reducing the size of a bearing, without necessarily relying on the coaxiality between the motor shaft (axis) and the shaft (axis) of the one-way clutch.

DETAILED DESCRIPTION

Hereinafter, an embodiment of an electric reel according to the present disclosure will be described in detail with reference to the accompanying drawings. Components common in a plurality of drawings are assigned with the same reference signs throughout the plurality of drawings. It should be noted that the drawings are not always illustrated in a precise aspect ratio for the convenience of description.

First, with reference to FIG. 1, a basic configuration of an electric reel (fishing electric reel) 1 according to one embodiment of the present disclosure will be described. As illustrated in the drawing, the electric reel 1 is configured to wind a fishing line onto a spool 2, to switch between a state where the fishing line can be released from the spool 2 and a state where the fishing line cannot be released from the spool 2, to allow the spool 2 to slip when a tension equal to or greater than a set value is applied to the fishing line (drag function), and furthermore, to set a threshold tension and adjust a braking force for preventing backlash at the time of dropping or casting (throwing) a rig.

Figure 1:
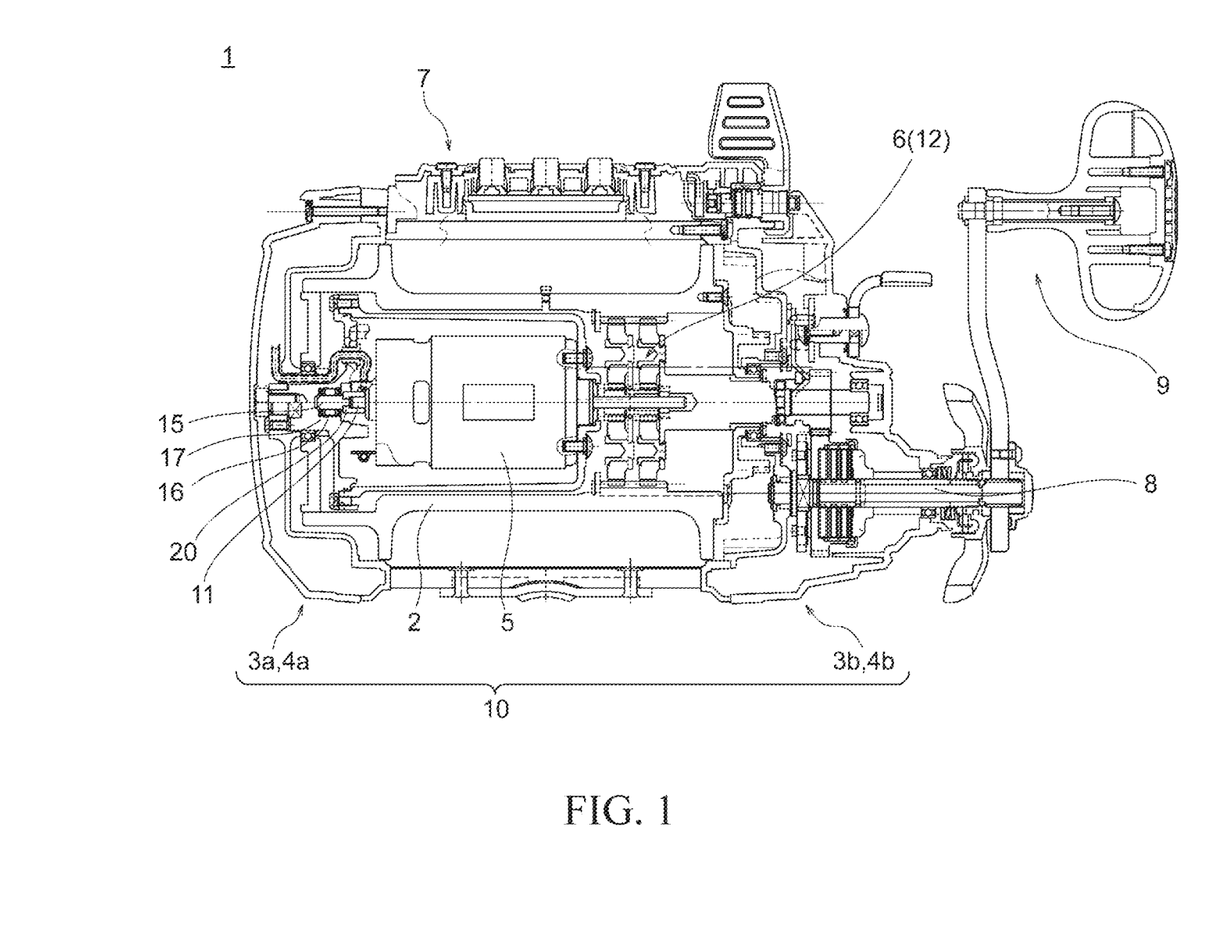
FIG. 1 is a view describing a basic configuration of an electric reel according to one embodiment of the present disclosure.
Figure 2:
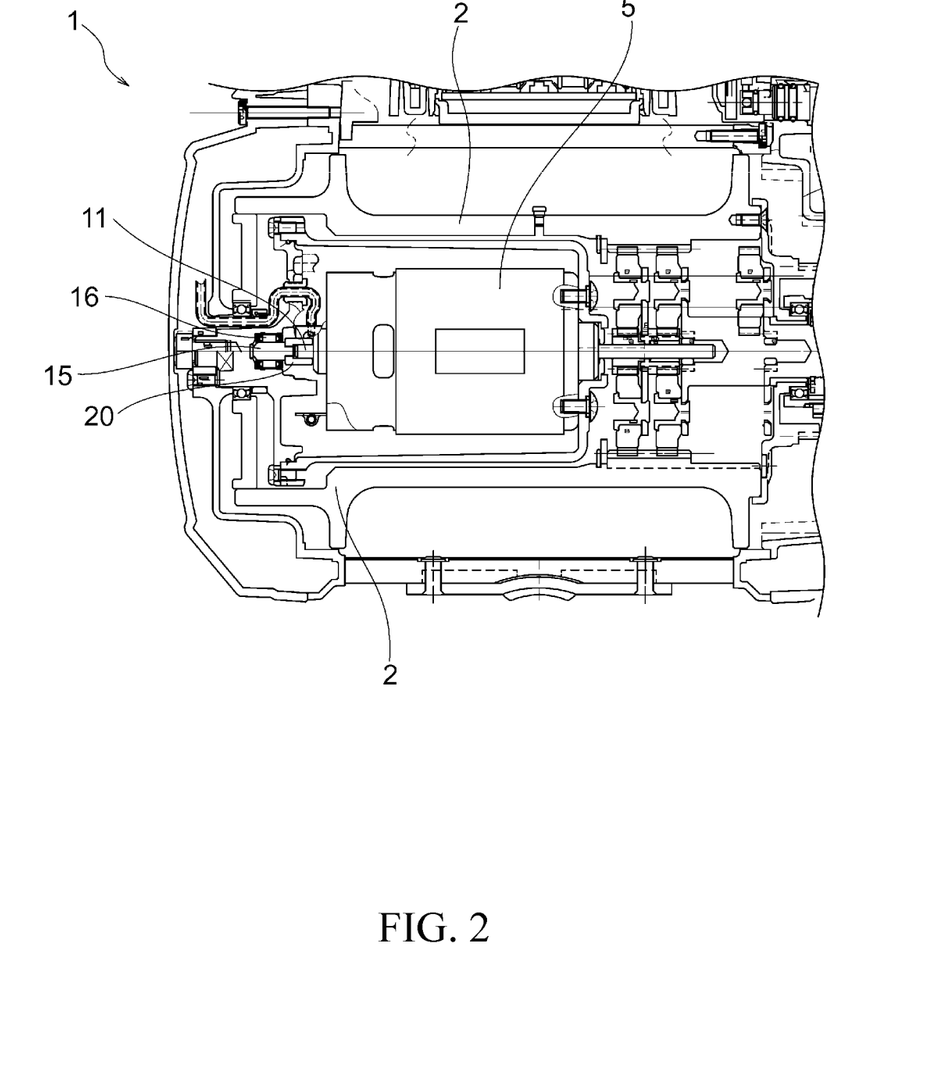
FIG. 2 is a view describing the electric reel according to one embodiment of the present disclosure.
Figure 3:
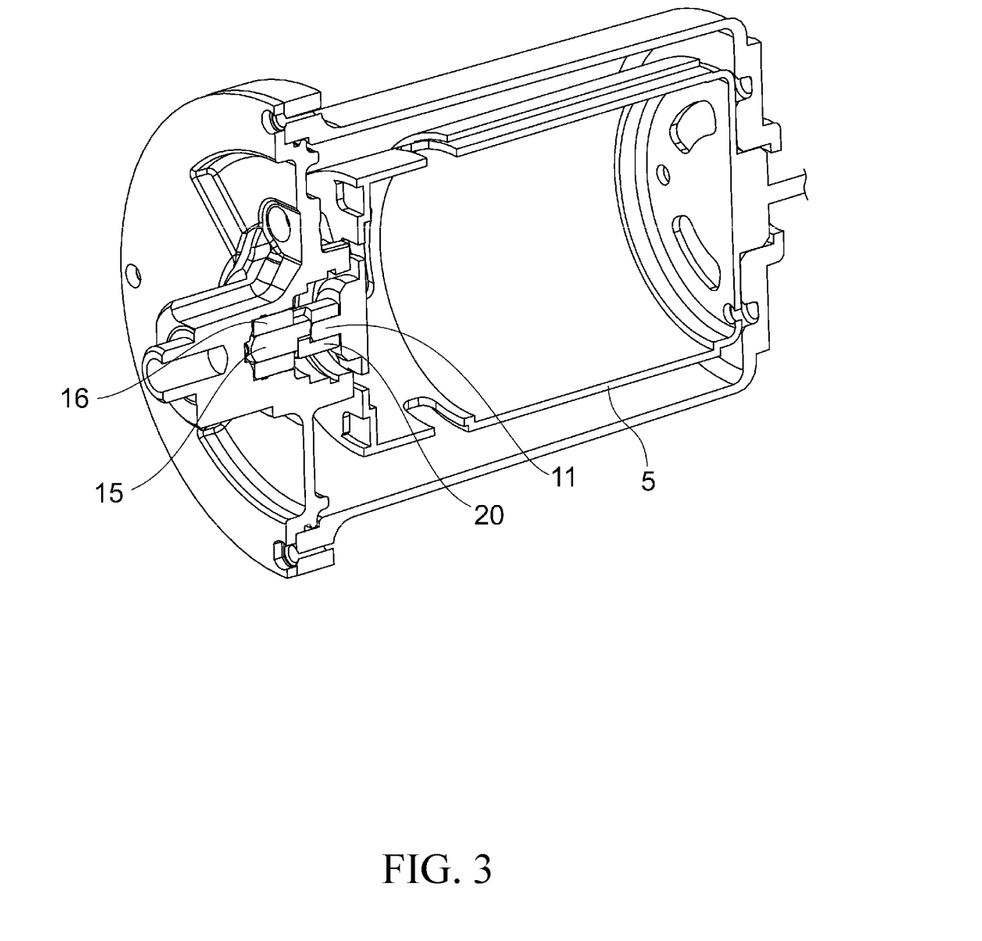
FIG. 3 is a view describing a connection structure between a motor and a one-way clutch in the electric reel according to one embodiment of the present disclosure.
Figure 4:
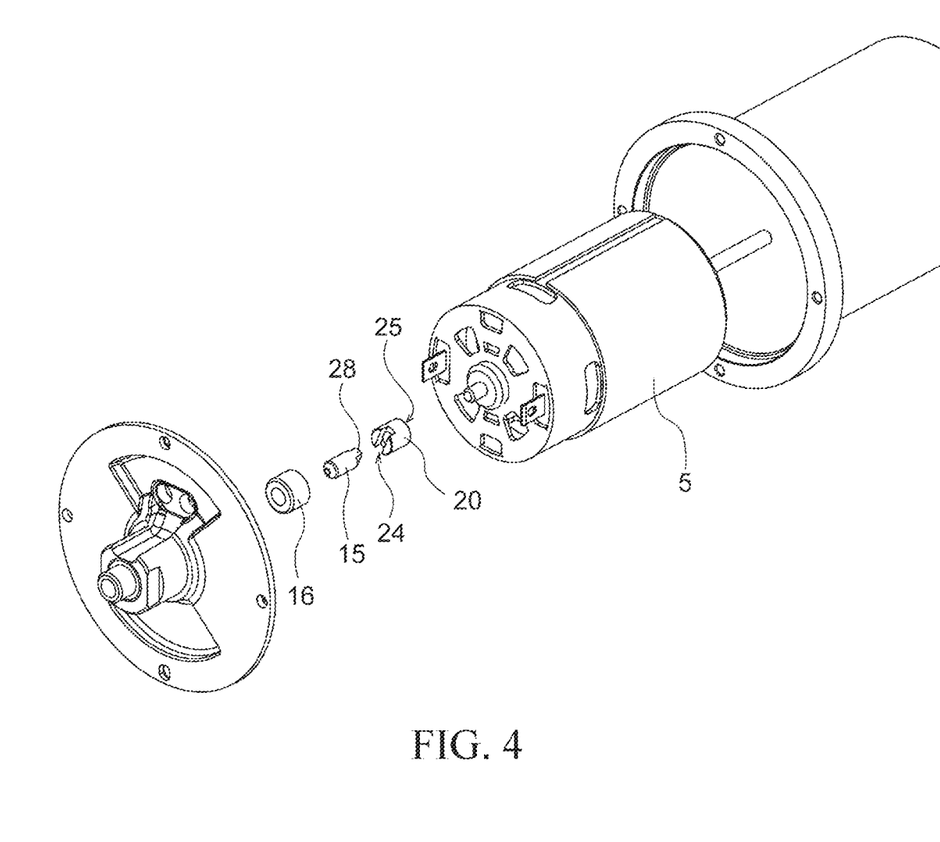
FIG. 4 is an exploded perspective view of the connection structure between the motor and the one-way clutch in the electric reel according to one embodiment of the present disclosure.
Figure 5:
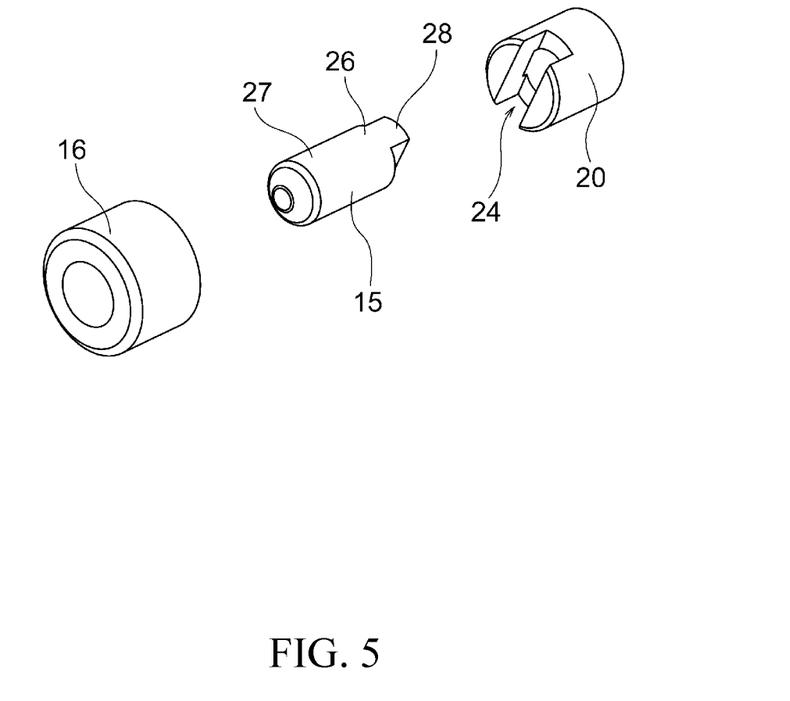
FIG. 5 is a view describing connection members between the motor and the one-way clutch in the electric reel according to one embodiment of the present disclosure.
Figure 6:
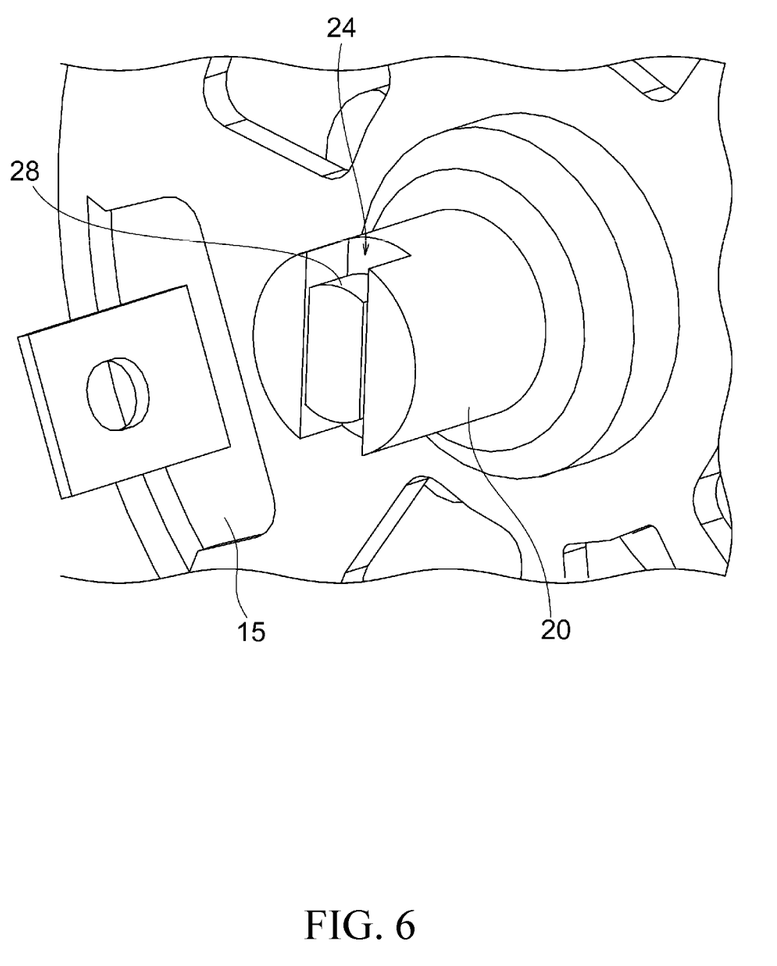
FIG. 6 is a view describing connection members between the motor and the one-way clutch in the electric reel according to one embodiment of the present disclosure.
Figure 7:
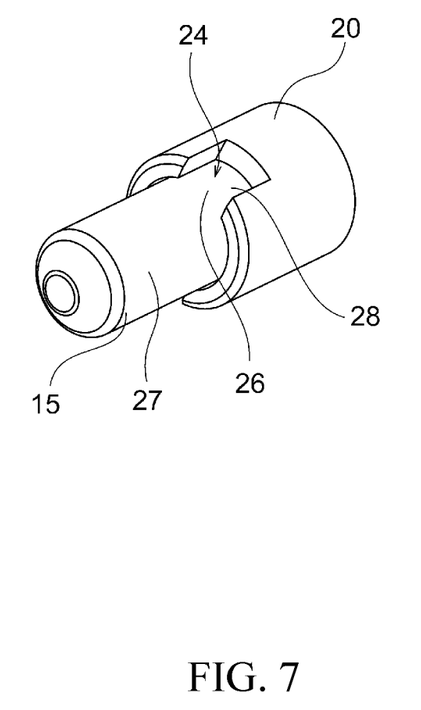
FIG. 7 is a view describing an engagement structure between a one-way clutch shaft member and a motor shaft fixing member in the electric reel according to one embodiment of the present disclosure.

Also as illustrated in FIG. 1, the electric reel 1 comprises a reel body 10 having left and right frames 3a and 3b arranged to be separated from each other on the left and right sides, and side plates 4a and 4b that cover the left and right frames 3a and 3b. The spool 2, a motor (electric motor) 5, a reduction mechanism 6, and a fishing information device (control case having a display part) 7 are provided between the left and right frames 3a and 3b. A handle shaft 8 is rotatably supported by the right frame 3b and the right side plate 4b, and a handle (operating part) 9 is attached to an end of the handle shaft 8. Here, the left and right frames 3a and 3b are not limited to being formed by a truss structure. That is, the left frame 3a and the right frame 3b of the left and right frames 3a and 3b may be formed separately from each other or integrally with each other.

The left and right frames 3a and 3b are portions forming a skeleton of the reel body 10 and are made of, for example, a metal material such as an aluminum alloy or a magnesium alloy, but are not limited thereto. The left and right frames 3a and 3b are integrated via a plurality of support pillars not illustrated. Furthermore, a cylindrical front frame is provided on a front portion side of the left and right frames 3a and 3b. The front frame is made of, for example, a metal material such as an aluminum alloy or a magnesium alloy, but is not limited thereto. The motor 5 and the reduction mechanism 6 are accommodated inside the front frame.

The spool 2 is rotationally driven in a fishing line winding direction via the reduction mechanism 6 and the like by rotational driving of the motor 5. The reduction mechanism 6 is provided on a right frame 3b side and reduces the output of the motor 5. Furthermore, as illustrated in FIG. 1, the reduction mechanism 6 comprises a planetary gear mechanism 12 installed between a drive shaft (motor shaft) 11 of the motor 5 and the right frame 3b.

Here, the planetary gear mechanism 12 comprises a sun gear, an internal tooth, and a plurality of planetary gears. The sun gear is anti-rotationally fixed to a tip end of the drive shaft (motor shaft) 11 of the motor 5, and integrally rotates with the drive shaft (motor shaft) 11.

A one-way clutch 16 is mounted on an axial end of an input shaft (one-way clutch shaft member) 15. The one-way clutch 16 has a function of transmitting the rotation of the input shaft 15 in one direction to an output shaft. The one-way clutch 16 is arranged between an outer peripheral surface of the axial end of the input shaft 15 and an inner peripheral surface of a cylindrical portion of the output shaft 17.

The output shaft is desirably coaxially arranged with the input shaft (one-way clutch shaft member) 15 and the drive shaft 11. The output shaft comprises a cylindrical portion, the cylindrical portion covers the axial end of the input shaft 15 from the outer peripheral side. A driving force from the input shaft 15 is input to the output shaft through the one-way clutch 16.

Next, with reference to FIGS. 2 to 7, the electric reel 1 according to one embodiment of the present disclosure will be further described. As illustrated in the drawings, the electric reel 1 according to one embodiment of the present disclosure comprises the spool 2 around which a fishing line is wound, the motor 5 having the motor shaft 11 and driven for rotating the spool 2, the one-way clutch 16 provided for preventing reverse rotation of the motor 5, a motor shaft fixing member 20 fixed to the motor shaft 11, and the one-way clutch shaft member 15 fitted into the one-way clutch 16. The electric reel 1 is configured such that rotation of the motor 5 is transmitted to the one-way clutch 16 through the motor shaft fixing member 20 and the one-way clutch shaft member 15. Furthermore, in the electric reel 1 according to one embodiment of the present disclosure, the motor shaft fixing member 20 and the one-way clutch shaft member 15 are configured to transmit the rotation with allowing a predetermined amount of clearance therebetween. Here, the "allowing a predetermined amount of clearance" means that a gap is intentionally formed in the rotation (motion) direction. In this case, the "predetermined amount of" clearance refers to a degree of clearance with which the rotation of the input side (input shaft) is transmitted to the output side while the input side makes at least one rotation (360° rotation). That is, the degree of clearance with which the rotation is transmitted to the output side means that the output side (absorbs the clearance and) rotates in the same direction as the input side within a range of less than one rotation, while the input side makes one rotation. On the other hand, a case where the output side does not rotate while the input side makes one rotation, despite being receiving the force, does not meet the "predetermined amount of clearance" described in the present specification. Furthermore, as described in comparison with the "Oldham coupling", in the case of the "Oldham coupling", while the rotation can be transmitted even when the shafts are not on a straight line, the two shafts need to be parallel. In contrast, the electric reel 1 according to one embodiment of the present disclosure is configured such that the rotation of the motor 5 is transmitted to the one-way clutch 16 through the motor shaft fixing member 20 and the one-way clutch shaft member 15, and as described later, the "predetermined amount of clearance" is deliberately allowed between the motor shaft fixing member 20 and the one-way clutch shaft member 15.

In this manner, in consideration of the fact that it is not easy to manufacture and arrange the motor shaft 11 and the one-way clutch shaft member 15 so as to strictly maintain coaxiality and also in consideration of manufacturing cost, a necessary and sufficient driving force of the motor 5 is made to be transmitted to the one-way clutch 16, while assuming that the above-described predetermined amount of clearance is allowed. As a result, it is possible to provide an electric reel that enables rotation transmission from the motor 5 to the one-way clutch 16, prolongs the product life, and can reduce the cost by reducing an outer diameter of the one-way clutch 16 and reducing the size of a bearing, without necessarily relying on the coaxiality between the motor shaft (axis) 11 and the shaft (axis) of the one-way clutch 16.

More specifically, as illustrated in FIGS. 4 to 7, in the electric reel 1 according to one embodiment of the present disclosure, the motor shaft fixing member 20 has a recess 24 at one end (first end) as viewed in the axial direction of the motor shaft 11, and a fitting portion 25 at the other end (second end). The motor shaft 11 is press-fitted into the fitting portion 25.

Furthermore, as illustrated in FIGS. 4 to 7, in the electric reel 1 according to one embodiment of the present disclosure, the one-way clutch shaft member 15 has a protrusion 28 at one end (first end) 26 as viewed in the axial direction of the one-way clutch shaft member 15. The protrusion 28 of the one-way clutch shaft member 15 is engaged with the recess 24 of the motor shaft fixing member 20. In this case, an engagement (fitting) width of the protrusion 28 is smaller than an engagement (fitting) width of the recess 24 with a gap formed between the protrusion 28 and the recess 24. In this manner, clearance can be allowed.

Furthermore, as illustrated in FIGS. 4 to 7, in the electric reel 1 according to one embodiment of the present disclosure, the other end (second end) 27 of the one-way clutch shaft member 15 as viewed in the axial direction of the one-way clutch shaft member 15 is fitted into the one-way clutch 16 having a circular cylindrical shape by being inserted into the one-way clutch 16. In this manner, reverse rotation of the one-way clutch shaft member 15 can be prevented.

The engagement structure between the one-way clutch shaft member 15 and the motor shaft fixing member 20 may be basically any structure as long as it can mechanically transmit rotation with a predetermined gap formed therebetween. Hereinafter, another aspect of the engagement structure between the one-way clutch shaft member 15 and the motor shaft fixing member 20 in the electric reel 1 according to one embodiment of the present disclosure will be described.

Figure 8A:
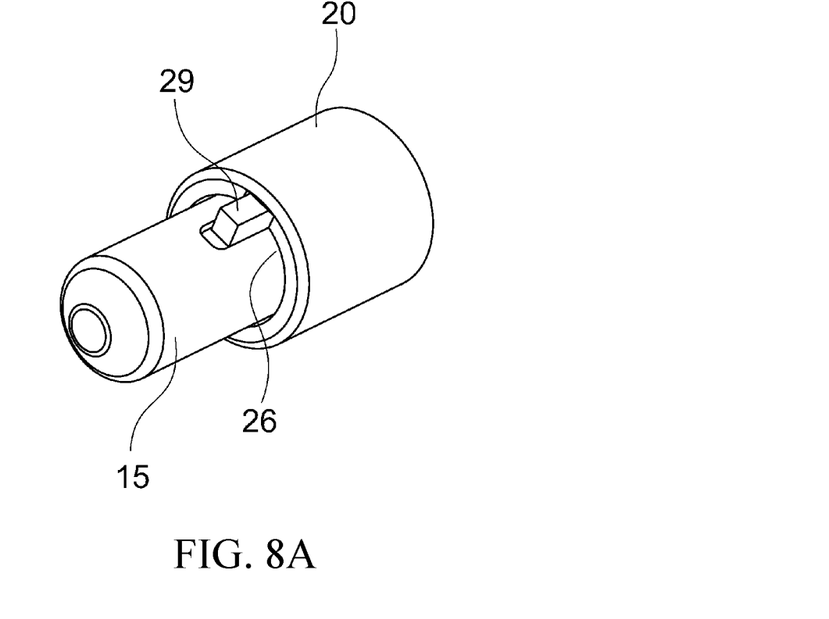
FIG. 8A is a view describing an engagement structure between the one-way clutch shaft member and the motor shaft fixing member in the electric reel according to one embodiment of the present disclosure.
Figure 8B:
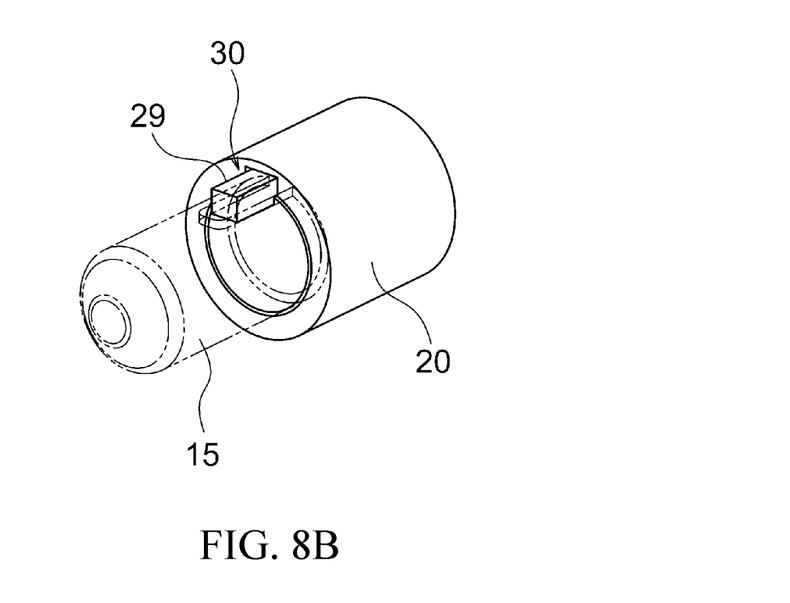
FIG. 8B is a view describing the inside of the engagement structure between the one-way clutch shaft member and the motor shaft fixing member in the electric reel according to one embodiment of the present disclosure.
Figure 8C:
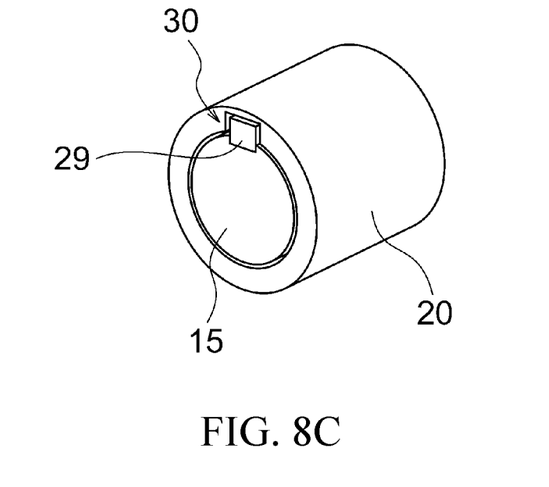
FIG. 8C is a cross-sectional view of the engagement structure between the one-way clutch shaft member and the motor shaft fixing member in the electric reel according to one embodiment of the present disclosure.

First, as illustrated in FIGS. 8A to 8C, in the electric reel 1 according to another embodiment of the present disclosure, the one-way clutch shaft member 15 has a key member 29 at the one end (first end) 26 as viewed in the axial direction of the one-way clutch shaft member 15. The key member 29 of the one-way clutch shaft member 15 is engaged with a key groove 30 of the motor shaft fixing member 20. In this case, an engagement width of the key member 29 is smaller than an engagement width of the key groove 30 with a gap formed between the key member 29 and the key groove 30. In this manner, clearance can be allowed.

Figure 9A:
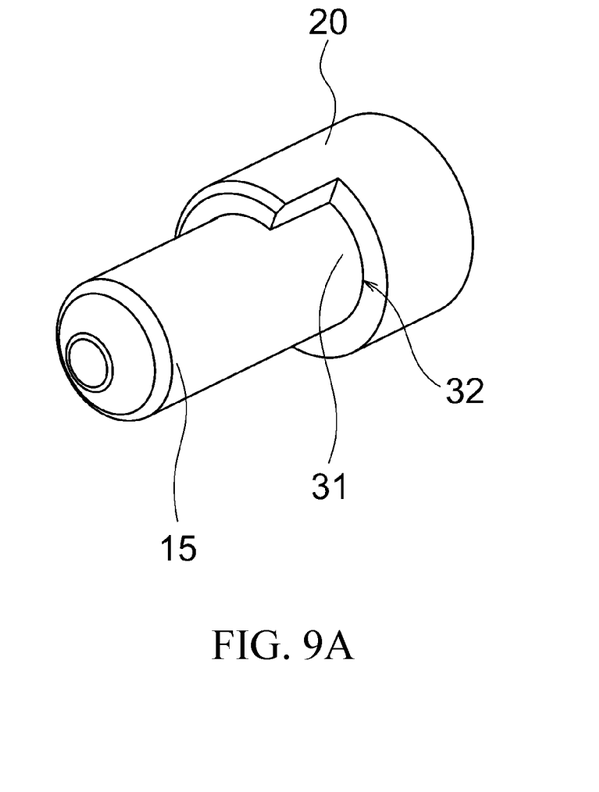
FIG. 9A is a view describing an engagement structure between the one-way clutch shaft member and the motor shaft fixing member in the electric reel according to one embodiment of the present disclosure.
Figure 9B:
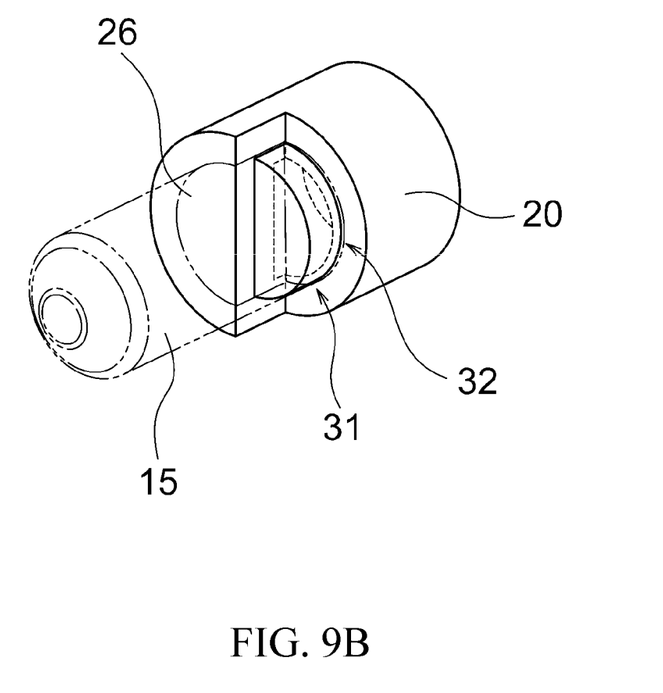
FIG. 9B is a view describing the inside of the engagement structure between the one-way clutch shaft member and the motor shaft fixing member in the electric reel according to one embodiment of the present disclosure.

Next, as illustrated in FIGS. 9A and 9B, in the electric reel 1 according to another embodiment of the present disclosure, the one-way clutch shaft member 15 has a semicircular protrusion 31 at the one end (first end) 26 as viewed in the axial direction of the one-way clutch shaft member 15. The semicircular protrusion 31 of the one-way clutch shaft member 15 is engaged with a semicircular recess 32 of the motor shaft fixing member 20. In this case, an engagement width of the semicircular protrusion 31 is smaller than an engagement width of the semicircular recess 32 with a gap formed between the semicircular protrusion 31 and the semicircular recess 32. In this manner, clearance can be allowed.

Dimensions, materials, and arrangements of the components described in the present specification are not limited to those explicitly described in the embodiments, and the components may be modified to have any dimensions, materials, and arrangements that may fall within the scope of the present disclosure. Furthermore, components not explicitly described in the present specification can be added to the described embodiments, or some of the components described in each embodiment can be omitted.

What is claimed is:

1. An electric reel comprising:
   a spool around which a fishing line is wound;
   a motor having a motor shaft and driven for rotating the spool;
   a one-way clutch provided for preventing reverse rotation of the motor;
   a motor shaft fixing member fixed to the motor shaft; and
   a one-way clutch shaft member fitted into the one-way clutch, wherein:
   (i) rotation of the motor is transmitted to the one-way clutch through the motor shaft fixing member and the one-way clutch shaft member, and
   (ii) the motor shaft fixing member and the one-way clutch shaft member transmit the rotation with allowing a predetermined amount of clearance therebetween in a direction of the rotation.

2. The electric reel according to claim 1, wherein the motor shaft fixing member has a recess at one end in an axial direction of the motor shaft, and has a fitting portion at another end, the motor shaft being fitted into the fitting portion.

3. The electric reel according to claim 2, wherein the one-way clutch shaft member has a protrusion at one end in the axial direction of the one-way clutch shaft member, and the protrusion of the one-way clutch shaft member is engaged with the recess of the motor shaft fixing member.

4. The electric reel according to claim 1, wherein another end of the one-way clutch shaft member in the axial direction of the one-way clutch shaft member is fitted into the one-way clutch having a circular cylindrical shape.

* * * * *